United States Patent
Ma et al.

(10) Patent No.: US 12,417,156 B2
(45) Date of Patent: Sep. 16, 2025

(54) METHOD FOR DYNAMICALLY CONFIGURING DATA SWITCH TO ENABLE RATE ADAPTION BETWEEN COMMUNICATION DEVICES, DATA SWITCH AND STORAGE MEDIUM

(71) Applicant: Fulian Precision Electronics (Tianjin) Co., LTD., Tianjin (CN)

(72) Inventors: Teng-Fei Ma, Tianjin (CN); Jie Yuan, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 146 days.

(21) Appl. No.: 18/368,753

(22) Filed: Sep. 15, 2023

(65) Prior Publication Data
US 2024/0385938 A1  Nov. 21, 2024

(30) Foreign Application Priority Data
May 15, 2023 (CN) .......................... 202310547052.X

(51) Int. Cl.
*G06F 11/22* (2006.01)
*G06F 11/273* (2006.01)

(52) U.S. Cl.
CPC ...... *G06F 11/2221* (2013.01); *G06F 11/2268* (2013.01); *G06F 11/2733* (2013.01)

(58) Field of Classification Search
CPC ............. G06F 11/2221; G06F 11/2268; G06F 11/2733
See application file for complete search history.

(56) References Cited

U.S. PATENT DOCUMENTS

| | | | | |
|---|---|---|---|---|
| 6,147,991 | A * | 11/2000 | Rogers | H04Q 11/0478 370/389 |
| 6,487,208 | B1 * | 11/2002 | Chirashnya | H04L 41/0803 370/400 |
| 2003/0179703 | A1 * | 9/2003 | Levy | H04L 41/06 370/230 |
| 2008/0144499 | A1 * | 6/2008 | Adhikari | H04L 47/22 370/232 |
| 2012/0170585 | A1 * | 7/2012 | Mehra | H04L 49/25 370/400 |
| 2017/0070451 | A1 * | 3/2017 | Choi | H04L 69/26 |
| 2017/0093486 | A1 * | 3/2017 | Rad | G01M 11/3145 |

FOREIGN PATENT DOCUMENTS

CN  116055007  5/2023

OTHER PUBLICATIONS

"A Lightweight Scheme of Active-Port-Aware Monitoring in Software-Defined Networks" by Oh IEEE Transactions on Network and Service Management ( vol. 18, Issue: 3, Sep. 2021) (Year: 2021).*

* cited by examiner

*Primary Examiner* — Joseph O Schell
(74) *Attorney, Agent, or Firm* — ScienBiziP, P.C.

(57) ABSTRACT

A test method based on a data switch is provided. In the method, a configuration instruction sent from the upper computer is received, and the configuration instruction comprises a direction parameter of data flow and a rate parameter, the data switch is configured according to the direction parameter of data flow and the rate parameter, and a test based on the configured data switch is performed. The method can not only realize rate conversion of data transmission between the communication devices, but also improve convenience and flexibility of port configuration.

14 Claims, 6 Drawing Sheets

METHOD FOR DYNAMICALLY CONFIGURING DATA SWITCH TO ENABLE RATE ADAPTION BETWEEN COMMUNICATION DEVICES, DATA SWITCH AND STORAGE MEDIUM

FIELD

The present disclosure relates to a field of testing, in particular to a test method which based on a data switch, a data switch, and a storage medium.

BACKGROUND

In a current test scheme, it is usually necessary to design programs repeatedly to change a port configuration to accommodate different test requirements. However, technical threshold of program design leads to some difficulties in changing the port configuration. In addition, a rate mismatch between the devices will result in no communication between the devices, making testing impossible.

DETAILED DESCRIPTION

It should be noted that in the present disclosure a term "at least one" refers to one or more and "multiple" refers to two or more. "And/Or", which describes an associative relationship of associative objects, indicates that there can be three relationships.

For example, A and/or B may indicate that A exists alone, A and B exist simultaneously, or B exists alone, where A and B may be singular or plural. The terms "first," "second," "third," "fourth," and the like, if any, in the specification and claims of the present disclosure and in the accompanying drawings are intended to discriminate between similar objects and are not intended to describe a particular order or a precedence order.

In at least one embodiment of the present disclosure, words such as "exemplary" or "for example" are used as examples, exemplifications or illustrations. Any embodiment or design described as "exemplary" or "such as" in the embodiments of the present application is not to be construed as preferred or advantageous over other embodiments or designs. Specifically, the use of words such as "exemplary" or "for example" is intended to present relevant concepts in a specific way. The following embodiments and features in the embodiments may be combined with each other without conflict.

In some tests, an upper computer may need to collect serial data from a test equipment. However, a serial port speed of the test equipment is often slow and does not match a speed of the upper computer. For example, the serial port speed of some older test equipment may be only 120 kbps, while the speed of the upper computer is as high as 460 kbps. A rate mismatch between the upper computer and the test equipment can cause communication failure, resulting in test failure. Additionally, in other test scenarios, it may be necessary to monitor the test equipment, but it is difficult to monitor the test equipment through the transmission data of the test equipment.

To solve above issue, the present disclosure provides a test method based on data switch, a data switch, and a storage medium. The test method based on the data switches provided in the embodiment of the present disclosure can be applied to one or more data switches and is described below in combination with an application scenario provided in the embodiment of the present disclosure.

Figure 1:
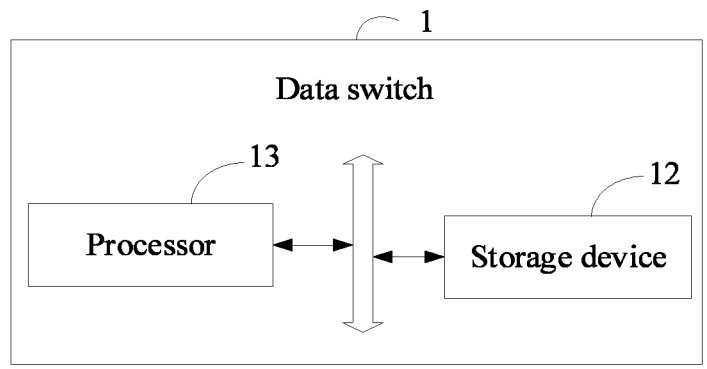
FIG. 1 is a block diagram of a data switch according to an embodiment of the present disclosure.

FIG. 1 is a block diagram of a data switch provided by an embodiment of the present disclosure. As shown in FIG. 1, the data switch 1 may include, but is not limited to, a storage device 12, at least one processor 13, and computer programs stored in the storage device 12 and operable on the at least one processor 13, such as test programs based on the data switch.

The data switch 1 is a device capable of automatically performing parameter value calculation and/or information processing according to predetermined or stored instructions. And hardware of the data switch includes, but is not limited to, a microprocessor, an application specific integrated circuit (AIC), a programmable gate array (FPGA), a digital signal processor (DSP), an embedded device, and the like.

The data switch 1 may be a microcontroller. For example, the data switch may be a Scanning Tunneling Microscopy (STM) 32 microcontroller, a Personal Internet Communicator (PIC) microcontroller, or an AVR microcontroller. The present disclosure does not limit the data switch 1.

The data switch 1 can communicate with other devices through a network, and the network includes, but is not limited to, Internet, Wide Area Network (WAN), Metropolitan Area Network (MAN), Local Area Network (LAN), Virtual Private Network (VPN), etc.

Figure 2:
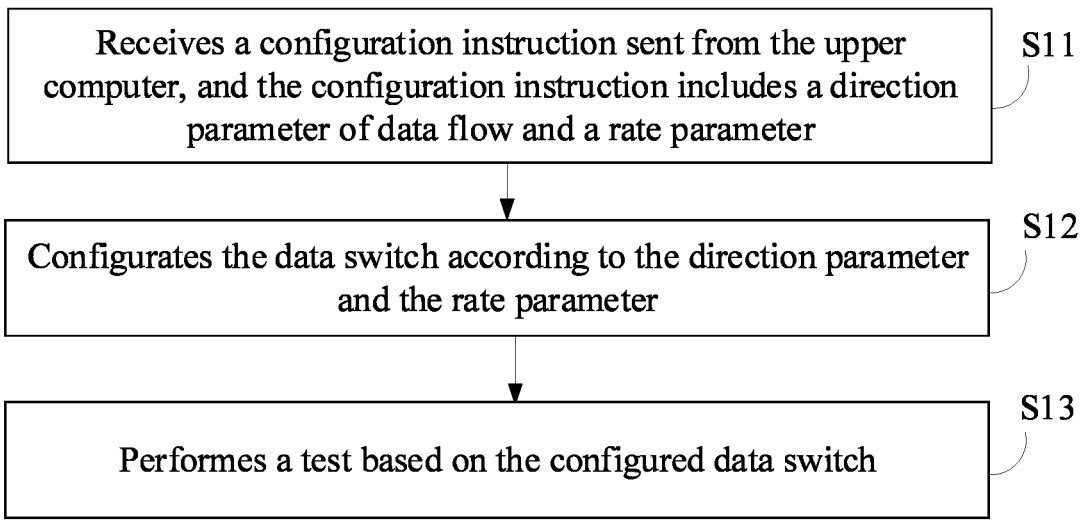
FIG. 2 is a flowchart of a test method based on a data switch according to an embodiment of the present disclosure.

As shown in FIG. 2, a flowchart of a test method based on data switch provided by an embodiment of the present disclosure. Depending on different requirements, an order of blocks in the flowchart can be adjusted according to the actual requirements, and some blocks can be omitted. An implementation body of the method is a data switch, such as the data switch 1 shown in FIG. 1.

Block S11, receiving a configuration instruction sent from the upper computer, and the configuration instruction includes a direction parameter of data flow and a rate parameter.

In some embodiments, the data switch communicates with the upper computer, for example, the data switch can communicate with the upper computer through Bluetooth, hotspot, Wi-Fi, and other means. The upper computer includes, but is not limited to, any device that can generate and send control commands, such as a personal computer, a tablet computer, or a smart phone, and the present disclosure does not limit the upper computer.

In some embodiments, the configuration instruction can be input by a user through the upper computer according to actual needs, and then the data switch can accept the configuration instruction sent from the upper computer. The direction parameter is used to configure the receiving/sending function (e.g., a direction of data flow) of the port in the data switch, and the rate parameter is used to configure the number of code symbols transmitted by the port in the data switch per unit time (that is, a rate of transmitting signal). The port may be an asynchronous serial communication port (UART port), or the port may be other ports, which is not limited in the present disclosure.

In this embodiment, the configuration instruction may include more configuration parameters of the port.

Block S12, configurating the data switch according to the direction parameter and the rate parameter.

In some embodiments, the data switch is configured according to the direction parameter and the rate parameter. The data switch configures the receiving/sending function of the ports of the data switch according to the direction parameter and determines several initial receiving ports and several initial sending ports. The data switch configures the rate of the initial receiving port and the initial sending port according to the rate parameter to complete the configuration of the data switch.

In one embodiment, the port may be a UART port, and according to actual configuration requirements, there may be multiple initial receiving ports and multiple initial sending ports.

In this embodiment, since the data switch can be configured directly according to the received configuration instructions without repeatedly designing the microcontroller program, the simplicity of port configuration can be improved. In addition, because the parameters in the configuration instructions can be flexibly set according to actual test needs, the configuration flexibility of the port can be improved.

Block S13, performing a test based on the configured data switch.

In some embodiments, a plurality of communication devices is connected through the configured data switch, and if rates of the plurality of interconnected communication devices are not the same, the configured data switch can be used to connect the interconnected communication devices to each other. The rates between multiple communication devices can be converted, or the multiple communication devices connected to each other can be monitored through the configured data switch.

In one embodiment, the plurality of communication devices includes, but are not limited to, devices such as computers, mobile phones, FPGAs, or programming chips, and the present disclosure does not limit the plurality of communication devices. When there is no need to convert the rates between the multiple communication devices, the configured data switch can realize the data transfer between the multiple communication devices connected to each other according to the initial sending port and the initial receiving port. The configured data switch may use other initial sending ports except for data transmission as monitoring ports, and monitor the multiple communication devices connected to each other through the monitoring ports.

Figure 3:
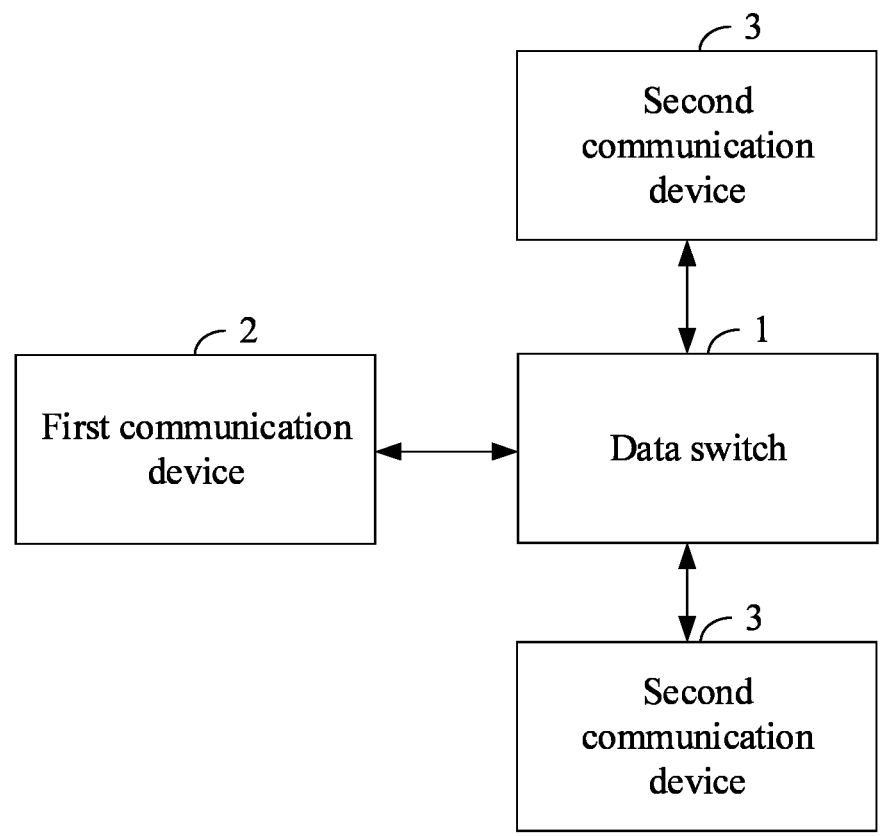
FIG. 3 is a schematic connection diagram between a configured data switch and a plurality of communication devices according to an embodiment of the present disclosure.

As shown in FIG. 3, FIG. 3 is a schematic connection diagram between a configured data switch and a plurality of communication devices provided by an embodiment of the present disclosure. In FIG. 3, the plurality of communication devices includes a first communication device 2 and a plurality of second communication devices 3. The first communication device 2 is connected to the plurality of second communication devices 3 through the configured data switch 1.

In this embodiment, the configured data switch can not only realize data transfer and rate conversion between the multiple communication devices but can also monitor the multiple communication devices.

Before performing a test based on the configured data switch, the method further includes setting the highest priority for internal receiving data of the configured data switch. So that the configured data switch can receive the data complete firstly before sending the data, thereby avoiding problems such as data reception errors (for example, incomplete data reception) caused by receiving and sending data at the same time.

In some other embodiments of the present disclosure, the configured data switch can also implement more test functions.

In at least one embodiment, through the above embodiment, the data switch receives configuration instructions from the upper computer. The configuration instructions include a direction parameter of data flow and a rate parameter. The direction parameter of the data flow configures the receiving/sending functions of the ports of the data switch. Thus, the port used to receive data and the port used to send data can be determined. The rate parameter configures the rate of each port in the data switch, so rate conversion between communication devices can be achieved, so that data transmission between devices corresponding to different rates can realized after the data switch is configured, and flexible testing can be carried out through the configured data switch. In addition, since the user directly sends configuration instructions to the data switch through the upper computer according to actual test needs, the configuration of the ports in the data switch can be completed, and there is no need to repeatedly design programs to configure the ports. Moreover, the direction parameter of data flow and the rate parameter can be flexibly set, thus improving the simplicity and flexibility of port configuration.

Figure 4:
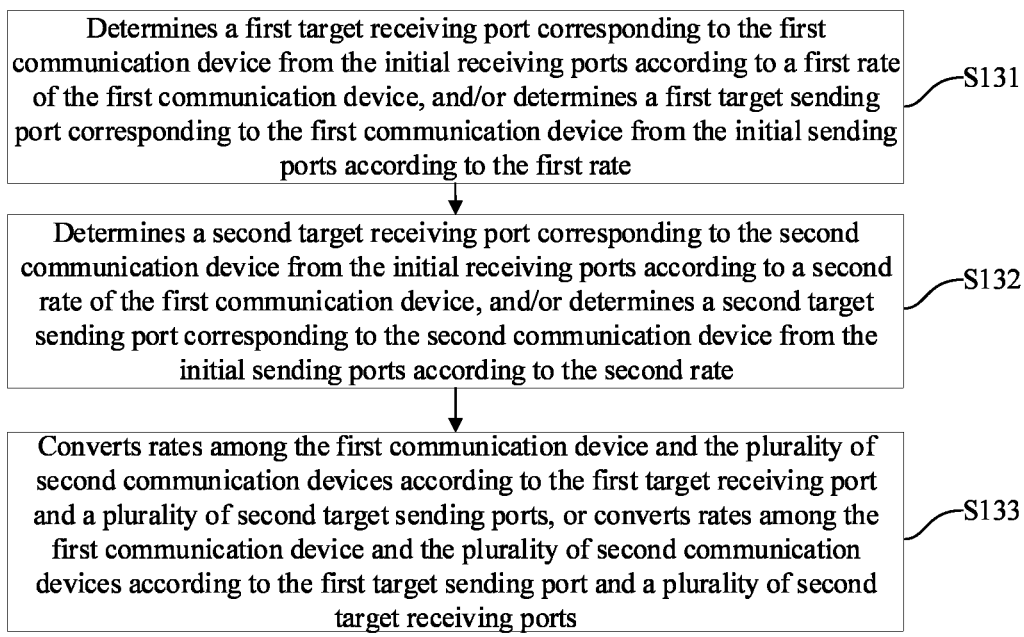
FIG. 4 is a flowchart of a method of converting rates between a plurality of communication devices according to an embodiment of the present disclosure.

In some embodiments, if the rates between the multiple interconnected communication devices are different and the multiple interconnected communication devices include a first communication device and a plurality of second communication devices, as shown in FIG. 4, FIG. 4 is a flowchart of a method of converting rates between a plurality of communication devices provided by an embodiment of the present disclosure. Specifically, the method includes the following blocks.

Block S131, the configured data switch determines a first target receiving port corresponding to the first communication device from the initial receiving ports according to a first rate of the first communication device, and/or the configured data switch determines a first target sending port corresponding to the first communication device from the initial sending ports according to the first rate.

In some embodiments, the configured data switch determines an initial receiving port corresponding to the configured data switch at the same rate as the first rate as the first target receiving port, and/or, the configured data switch determines an initial sending port corresponding to the same rate as the first rate in the configured data switch as the first target sending port. The first communication device may be an upper computer capable of generating and sending control commands, such as a computer or a mobile phone, and the first rate may be a signal transmission rate of a port in the first communication device. The ports in the first communication device include, but are not limited to, serial port, UART port, COM port, and USB port.

In this embodiment, the rates of the first target receiving port and the first target sending port are the same as the first rate of the first communication device. The configured data switch receives data transmitted from the first communication device through the first target receiving port at the first rate. And the configured data switch sends data to the first communication device through the first target sending port at the first rate.

Block S132, the configured data switch determines a second target receiving port corresponding to the second communication device from the initial receiving ports according to a second rate of the first communication device, and/or the configured data switch determines a second target sending port corresponding to the second communication device from the initial sending ports according to the second rate.

In some embodiments, the configured data switch determines an initial receiving port corresponding to the configured data switch at the same rate as the second rate as the second target receiving port, and/or, the configured data switch determines an initial sending port corresponding to the same rate as the second rate in the configured data switch as the second target sending port. The second communication device may be an upper computer capable of generating and sending control commands, such as a computer or a mobile phone, and the first rate may be a signal transmission rate of a port in the first communication device. The plurality of second communication devices may be lower computers such as FPGA, ARM, and PLC used to receive and feedback instructions from the upper computer, and each second rate may be a signal transmission rate of a port in each second communication device. The ports of the second communication device include, but are not limited to, serial port, UART port, COM port, and USB port.

In this embodiment, the rate of each second target receiving port and each second target sending port is the same as the second rate of the corresponding second communication device. Through any second target receiving port receives data transmitted from corresponding second communication device at the corresponding second rate, and through any second target sending port sends data to corresponding second communication device at the corresponding second rate, Block S133, the configured data switch converts rates among the first communication device and the plurality of second communication devices according to the first target receiving port and a plurality of second target sending ports, or the configured data switch converts rates among the first communication device and the plurality of second communication devices according to the first target sending port and a plurality of second target receiving ports.

In some embodiments, the configured data switch converts rates among the first communication device and the plurality of second communication devices according to the first target receiving port and the plurality of second target sending ports includes: the configured data switch receives test data sent from the first communication device according to the first target receiving port, and stores the received test data in a buffer of the configured data switch, when the first target receiving port is in an idle state, the configured data switch distributes the test data from the buffer to each second communication device through each second target sending port, enabling each second communication device to perform a test according to the received test data.

In at least one embodiment, the test data is used to test the plurality of second communication devices, and the test data may include data such as test cases or test programs, and the present disclosure does not limit the test data.

Figure 5:
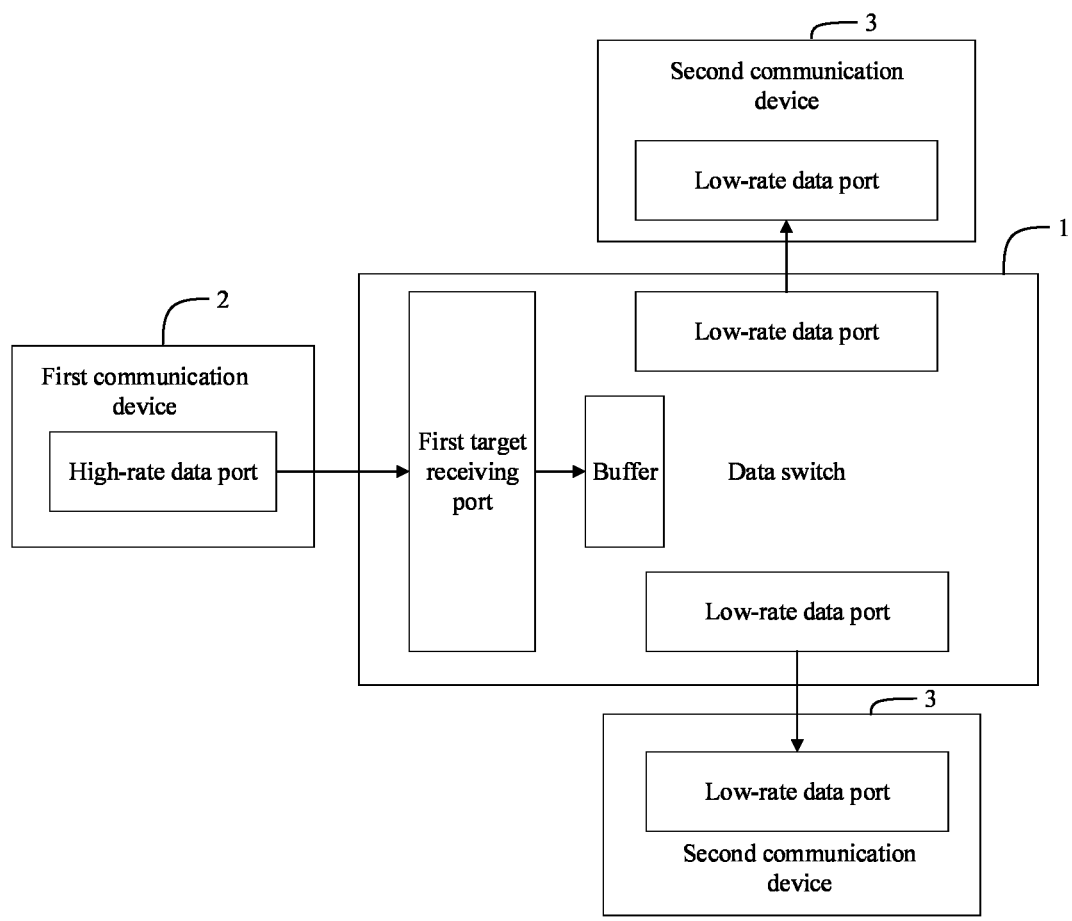
FIG. 5 is a schematic diagram of converting rates between multiple communication devices through a configured data switch according to an embodiment of the present disclosure.

For example, as shown in FIG. 5, FIG. 5 is a schematic diagram of converting rates between multiple communication devices through a configured data switch according to an embodiment of the present disclosure. In FIG. 5, the plurality of communication devices includes a first communication device 2 and a plurality of second communication devices 3, and the configured data switch 1 is connected to the first communication device 2 and the plurality of second communication devices 3. If the first rate of the port of the first communication device 2 is greater than the second rate of the port of each second communication device 3, determining that the port on the first communication device 2 is a high-speed data port, and setting each port on the second communication device 3 as a low-rate data port. The configured data switch 1 receives test data sent from the high-rate data port on the first communication device 2 at the first rate through the first target receiving port, and stores the received test data in the buffer, until all the test data is received completely. The configured data switch 1 sends the test data from the buffer to the low-speed data port of each second communication device 3 through each second target sending port at the second rate, thereby achieving convert rates between multiple communication devices.

In this embodiment, since the priority of internal receiving data of the configured data switch is set to the highest, the configured data switch will distribute the test data from the buffer to each second communication device through each second target sending port when the first target receiving port is in an idle state, which can avoid the problem of errors in data reception caused by simultaneously receiving and sending data. In addition, the test data can be sent to the plurality of second communication devices at the same time through the plurality of second target sending ports, realizing the offloading of test data (one piece of test data is distributed to multiple second communication devices at the same time). The configured data switch performs the functions of data transfer and rate conversion at the same time.

According to the above embodiment, the configured data switch converts rates among the first communication device and the plurality of second communication devices according to the first target receiving port and the plurality of second target sending ports includes: the configured data switch receives test results returned by each second communication device for the test data sent by the first communication device according to each second target receiving port, and sends the received test results to the first communication device through the first target sending port.

In this embodiment, through the plurality of second target receiving ports, the test results returned by multiple second communication devices can be collected at the same time. After receiving the test results, the first target sending port sends the test results to the first communication device, thereby realizing aggregation of test results.

In some other embodiments of the present disclosure, the data received and/or sent by the configured data switch is not limited to the test data and the test results. The above test data and test results are only examples, and the actual usage conditions are not limited to the test data and the test results.

Figure 6:
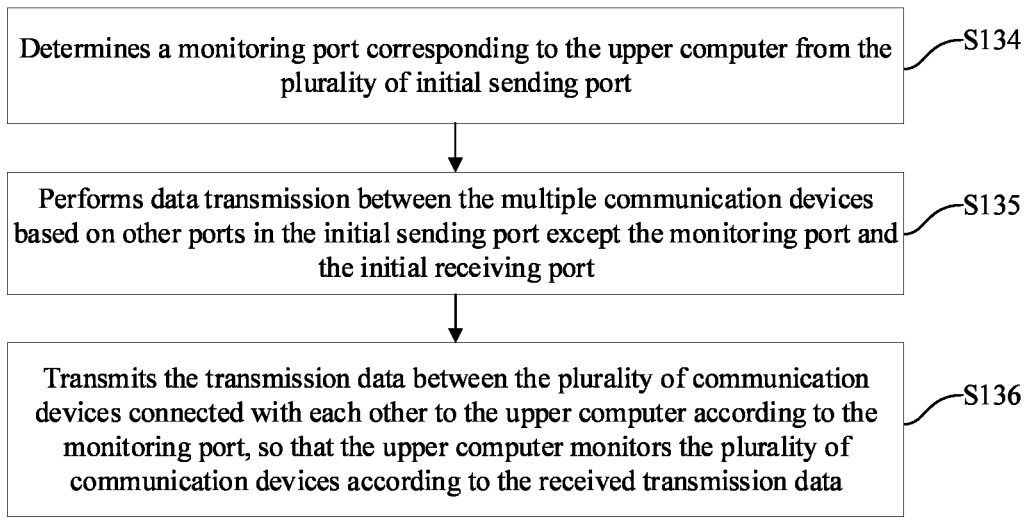
FIG. 6 is a flowchart of a method of monitoring through a configured data switch according to an embodiment of the present disclosure.

In some embodiments of the present disclosure, the detailed blocks of monitoring the multiple interconnected communication devices through the configured data switch may refer to the process introduction shown in FIG. 6.

As shown in FIG. 6, FIG. 6 is a flowchart of a method of monitoring through a configured data switch provided in one embodiment of the present disclosure. Specifically include the following blocks:

Block S134, the configured data switch determines a monitoring port corresponding to the upper computer from the plurality of initial sending port.

In some embodiments, a method of determining the monitoring port is basically the same as the method of determining the first target sending port or the second target sending port above, so the present disclosure will not repeat the description here.

Block S135, the configured data switch performs data transmission between the multiple communication devices based on multiple ports other than the monitoring port and the initial receiving port.

In some embodiments, the configured data switch transmits data through ports in the initial transmit port other than the monitoring port and receives data through the initial receiving port, thereby realizing data transmission between the plurality of communication devices.

In other embodiments, if the rates between the plurality of communication devices are different, the configured data switch also performs as a rate switch, the specific rate conversion blocks being described above with reference to blocks S131-S133, which are not repeated herein.

In this embodiment, the configured data switch can perform functions of data transfer and rate conversion at the same time.

Block S136, the configured data switch transmits the transmission data between the plurality of communication devices connected with each other to the upper computer according to the monitoring port, so that the upper computer monitors the plurality of communication devices according to the received transmission data.

Figure 7:
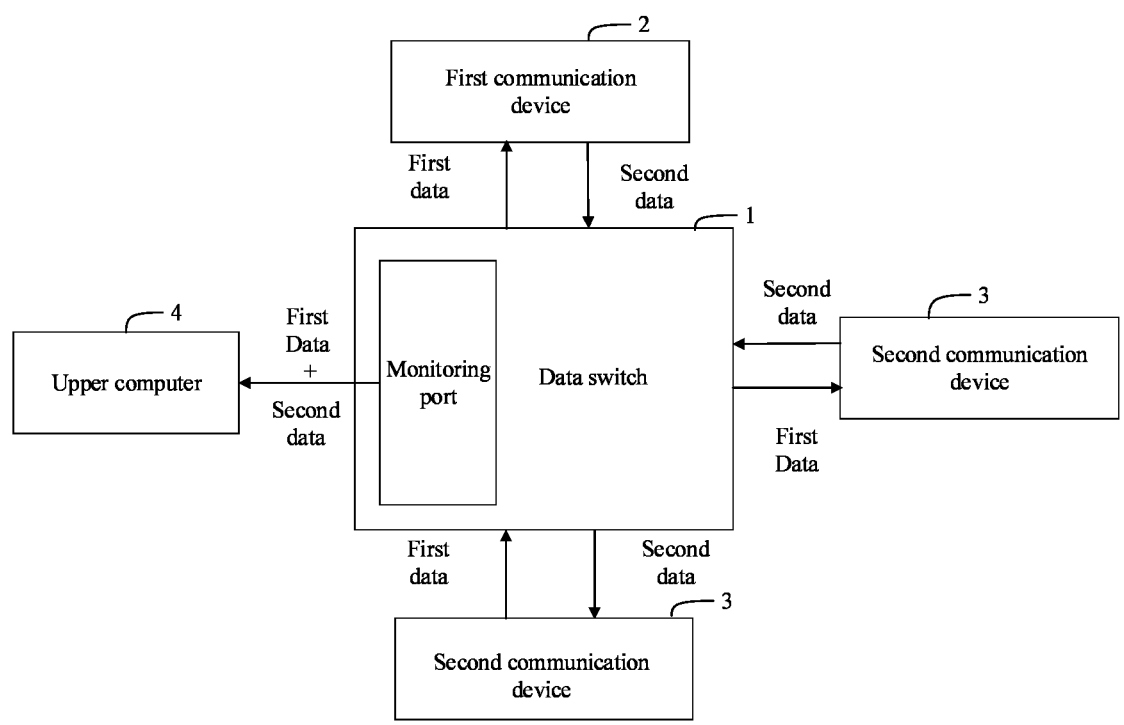
FIG. 7 is a schematic diagram of monitoring multiple communication devices through a configured data switch according to an embodiment of the present disclosure.

For example, as shown in FIG. 7, FIG. 7 is a schematic diagram of monitoring multiple communication devices through a configured data switch provided by an embodiment of the present disclosure. In FIG. 7, the plurality of communication devices includes a first communication device 2 and a plurality of second communication devices 3, and the configured data switch 1 connects the first communication device 2 and the plurality of second communication devices 3. The configured data switch 1 is connected to the upper computer 4 through a monitoring port, the configured data switch 1 receives the first data sent from the first communication device 2 and distributes the first data to each second communication device 3, and the configured data switch 1 receives the second data sent from each second communication device 3 and sends the second data to the first communication device 2. At the same time, the configured data switch 1 will also send the first data and each second data to the upper computer 4 through the monitoring port. The first data may be the test data in the above embodiment, and the second data may be the test result in the above embodiment.

In this embodiment, the upper computer monitors the communication process of the multiple communication devices by analyzing the transmission data, so as to promptly handle when an abnormality occurs in the multiple communication devices.

In one embodiment, following the previous description of the data switch in FIG. 1, the processor 13 may be a central processing unit CPU, or other general-purpose processors, digital signal processors DSP, application specific integrated circuit ASIC, Field-Programmable Gate Array FPGA or other programmable logic devices, discrete gate or transistor logic devices, discrete hardware components, etc. The general processor can be a microprocessor, or the processor can be any conventional processor. The processor 13 is a computing core and control center of the data switch 1 and uses various interfaces and lines to connect various parts of the entire data switch 1, and obtains an operating system of the data switch 1 and various installed applications, program codes, etc.

The processor 13 obtains the operating system of the data switch 1 and various installed application programs. The processor 13 obtains an application program to implement the blocks in each of the above-mentioned embodiments of the test method, such as the blocks shown in FIG. 2, FIG. 4, and FIG. 6.

For example, the computer program may be divided into one or more modules/units, such as an acceleration unit, and one or more modules/units are stored in the storage device 12 and retrieved by the processor 13 to complete the present disclosure. One or more modules/units may be a series of computer program instruction segments capable of completing specific functions. The instruction segments are used to describe the acquisition process of the computer program in the data switch 1.

The storage device 12 can be used to store computer programs and/or modules, and the processor 13 realizes various functions of the data switch 1 by running or obtaining the computer programs and/or modules stored in the storage device 12 and calling the data stored in the storage device 12. The storage device 12 can mainly include a program storage area and a data storage area. The program storage area can store an operating system, at least one application program required by a function (such as a sound playback function, an image playback function, etc.). The data may be created by the use of the server. In addition, the storage device 12 may include non-volatile memory, such as hard disk, internal memory, plug-in hard disk, smart memory card SMC, Secure Digital SD card, flash memory card, at least one disk storage device, flash memory device, or other non-volatile solid-state storage device.

The storage device 12 can be an external memory and/or an internal memory of the data switch 1. Further, the storage device 12 may be a physical storage, such as a memory stick and the like.

If the integrated modules/units of the data switch 1 are realized in the form of software function units and sold or used as independent products, they can be stored in a computer-readable storage medium. Based on this understanding, the present disclosure realizes all or part of the processes in the methods of the above embodiments and can also be completed by instructing related hardware through computer programs, and the computer programs can be stored in a computer-readable storage medium. When acquired by the processor, the blocks in the embodiments of the test method can be implemented.

In at least one embodiment, the computer program includes computer program code, and the computer program code may be in the form of source code, object code, obtainable file, or some intermediate form, etc. Computer-readable media may include any entity or device capable of carrying computer program code, recording media, U disk, removable hard disk, magnetic disk, optical disk, computer memory, read-only memory ROM.

With reference to FIG. 2, the storage device 12 in the data switch 1 stores multiple instructions to implement a test method based on the data switch. The processor 13 obtains multiple instructions to receive the configuration instructions sent from the upper computer, and the configuration instruction includes a direction parameter of data flow and a rate parameter, and the data switch is configured according to the direction parameter of data flow and the rate parameter; and a test is performed based on the configured data switch.

Specifically, for the specific implementation method of the above instruction by the processor 13, reference may be made to the description of relevant blocks in the embodiment corresponding to FIG. 2, and details are not repeated here.

In the several embodiments provided in the present disclosure, it should be understood that the disclosed systems, devices and methods can be implemented in other ways. For example, the device embodiments described above are only illustrative. For example, the division of modules is only a logical function division, and there may be other division methods in actual implementation.

Modules described as separate components may or may not be physically separated, and components shown as modules may or may not be physical units, that is, they may be located in one place, or they may be distributed to multiple network units. Some or all of the modules can be selected according to actual needs to achieve the purpose of the solution of this embodiment.

In addition, each functional module in each embodiment of the present disclosure may be integrated into one processing unit, each unit may exist separately physically, or two or more units may be integrated into one unit. The above-mentioned integrated units can be implemented in the form of hardware, or in the form of hardware plus software function modules.

Therefore, the embodiments should be regarded as exemplary and not restrictive in all points of view, and the scope of the disclosure is defined by the appended claims rather than the foregoing description, and it is intended that the scope of the present disclosure be defined by the appended claims rather than by the foregoing description. All changes within the meaning and range of equivalents of the elements are embraced in the present disclosure. Any reference sign in a claim should not be construed as limiting the claim concerned.

In addition, it is obvious that the word "comprising" does not exclude other elements or steps, and the singular does not exclude the plural. A plurality of units or means stated in this application may also be realized by software or hardware by one unit or means. The words "first," "second," etc., are used to indicate names and do not indicate any specific order.

Finally, it should be noted that the above embodiments are only used to illustrate the technical solutions of the present disclosure and are not limiting. Although the present disclosure has been described in detail with reference to the preferred embodiments, those of ordinary skill in the art should understand that the technical solutions of the present application can be modified. Modifications or equivalent substitutions may be made without departing from the spirit and scope of the technical solution of the present disclosure.

What is claimed is:

1. A method for dynamically configuring a data switch to enable a rate adaption between communication devices, the data switch is communicatively connected to an upper computer, the method comprising:
   receiving a configuration instruction sent from the upper computer, and the configuration instruction comprises a direction parameter of data flow and a rate parameter;
   configuring the data switch according to the direction parameter of the data flow and the rate parameter; and
   performing testing based on the data switch that has been configured, comprising:
   connecting to a plurality of communication devices through the data switch that has been configured, wherein the plurality of communication devices comprises a first communication device and a plurality of second communication devices;
   in response to rates of the plurality of communication devices being are different, determining a first target receiving port corresponding to the first communication device from a plurality of initial receiving ports according to a first rate of the first communication device;
   determining a plurality of second target sending ports corresponding to the plurality of second communication devices from a plurality of initial sending ports according to a second rate of each of the plurality of second communication devices; and
   receiving test data sent from the first communication device according to the first target receiving port;
   storing the test data in a buffer of the data switch that has been configured; and
   enabling each of the plurality of second communication devices to perform the testing according to the test data by distributing the test data from the buffer to each of the plurality of second communication devices through each of the plurality of second target sending ports in response to the first target receiving port being in an idle state.

2. The method according to claim 1, wherein configurating the data switch according to the direction parameter of the data flow and the rate parameter further comprises:
   determining the plurality of initial receiving ports and the plurality of initial sending ports by configuring a receiving/sending function of a plurality of ports of the data switch according to the direction parameter of the data flow; and
   completing the configuration of the data switch by configuring rates of the plurality of the initial receiving ports and the plurality of the initial sending ports according to the rate parameter.

3. The method according to claim 2, further comprising:
   determining a first target sending port corresponding to the first communication device from the plurality of initial sending ports according to the first rate;
   determining a plurality of second target receiving ports corresponding to the plurality of second communication devices from the plurality of initial receiving ports according to a second rate of the first communication device
   receiving test results returned by each of the plurality of second communication devices for the test data sent by the first communication device according to each of the plurality of second target receiving ports; and
   sending the received test results to the first communication device through the first target sending port.

4. The method according to claim 1, wherein performing the testing based on the data switch that has been configured further comprises:
   monitoring data transmission of the plurality of communication devices through the data switch that has been configured.

5. The method according to claim 4, wherein monitoring the data transmission of the plurality of communication devices through the data switch that has been configured further comprises:

determining a monitoring port corresponding to the upper computer from the plurality of initial sending ports;

performing the data transmission between the plurality of communication devices based on the plurality of ports other than the monitoring port and the plurality of initial receiving ports;

transmitting transmission data between the plurality of communication devices connected with each other to the upper computer according to the monitoring port; and monitoring the plurality of communication devices through the upper computer according to the transmission data.

6. A data switch communicatively connected to an upper computer, the data switch comprising:

a storage device;

at least one processor, wherein the storage device stores one or more programs, which when executed by the at least one processor, cause the at least one processor to:

receive a configuration instruction sent from the upper computer, and the configuration instruction comprises a direction parameter of data flow and a rate parameter, configurate the data switch according to the direction parameter of the data flow and the rate parameter, and perform testing based on the data switch that has been configured, comprising:

connect to a plurality of communication devices through the data switch that has been configured, wherein the plurality of communication devices comprises a first communication device and a plurality of second communication devices;

in response to rates of the plurality of communication devices being different, determine a first target receiving port corresponding to the first communication device from a plurality of initial receiving ports according to a first rate of the first communication device;

determine a plurality of second target sending ports corresponding to the plurality of second communication devices from a plurality of initial sending ports according to a second rate of each of the plurality of second communication devices; and receive test data sent from the first communication device according to the first target receiving port;

store the test data in a buffer of the data switch that has been configured; and enable each of the plurality of second communication devices to perform the testing according to the test data by distributing the test data from the buffer to each of the plurality of second communication devices through each of the plurality of second target sending ports in response that the first target receiving port is in an idle state.

7. The data switch according to claim 6, wherein the at least one processor configurates the data switch according to the direction parameter of the data flow and the rate parameter by:

determining the plurality of initial receiving ports and the plurality of initial sending ports by configuring a receiving/sending function of a plurality of ports of the data switch according to the direction parameter of the data flow; and completing the configuration of the data switch by configuring rates of the plurality of the initial receiving ports and the plurality of the initial sending ports according to the rate parameter.

8. The data switch according to claim 6, wherein the at least one processor is further caused to:

determine a first target sending port corresponding to the first communication device from the plurality of initial sending ports according to the first rate;

determine a plurality of second target receiving ports corresponding to the plurality of second communication devices from the plurality of initial receiving ports according to a second rate of the first communication device; and convert the rates among the first communication device and the plurality of second communication devices according to the first target receiving port and the plurality of second target sending ports, or converting rates among the first communication device and the plurality of second communication devices according to the first target sending port and the plurality of second target receiving ports;

receive test results returned by each of the plurality of second communication devices for the test data sent by the first communication device according to each of the plurality of second target receiving ports; and send the test results to the first communication device through the first target sending port.

9. The data switch according to claim 6, wherein the at least one processor performs the testing based on the data switch that has been configured by:

monitoring data transmission of the plurality of communication devices through the data switch that has been configured.

10. The data switch according to claim 9, wherein the at least one processor monitors the data transmission of the plurality of communication devices through the data switch that has been configured by:

determining a monitoring port corresponding to the upper computer from the plurality of initial sending ports;

performing the data transmission between the plurality of communication devices based on the plurality of ports other than the monitoring port and the plurality of initial receiving ports;

transmitting transmission data between the plurality of communication devices connected with each other to the upper computer according to the monitoring port; and monitoring the plurality of communication devices through the upper computer according to the transmission data.

11. A non-transitory storage medium comprising instructions, when the instructions are executed by a processor of a data switch, the data switch is communicatively connected to an upper computer, the processor is caused to perform a method for dynamically configuring a data switch to enable a rate adaption between communication devices, wherein the method comprises:

receiving a configuration instruction sent from the upper computer, and the configuration instruction comprises a direction parameter of data flow and a rate parameter;

configurating the data switch according to the direction parameter of data flow and the rate parameter; and performing testing based on the data switch that has been configured, comprising:

connecting to a plurality of communication devices through the data switch that has been configured, wherein the plurality of communication devices comprises a first communication device and a plurality of second communication devices;

in response that rates of the plurality of communication devices are different, determining a first target receiving port corresponding to the first communication device from a plurality of initial receiving ports according to a first rate of the first communication device;

determining a plurality of second target sending ports corresponding to the plurality of second communication devices from a plurality of initial sending ports according to a second rate of each of the plurality of second communication devices; and receiving test data sent from the first communication device according to the first target receiving port;

storing the test data in a buffer of the data switch that has been configured; and enabling each of the plurality of second communication devices to perform the testing according to the test data by distributing the test data from the buffer to each of the plurality of second communication devices through each of the plurality of second target sending ports in response to the first target receiving port being in an idle state.

12. The non-transitory storage medium according to claim 11, wherein configurating the data switch according to the direction parameter of the data flow and the rate parameter further comprises:

determining the plurality of initial receiving ports and the plurality of initial sending ports by configuring a receiving/sending function of a plurality of ports of the data switch according to the direction parameter of the data flow; and completing the configuration of the data switch by configuring rates of the plurality of the initial receiving ports and the plurality of the initial sending ports according to the rate parameter.

13. The non-transitory storage medium according to claim 12, wherein the method further comprises:

determining a first target sending port corresponding to the first communication device from the plurality of initial sending ports according to the first rate;

determining a plurality of second target receiving ports corresponding to the plurality of second communication devices from the plurality of initial receiving ports according to a second rate of the first communication device;

receiving test results returned by each of the plurality of second communication devices for the test data sent by the first communication device according to each of the plurality of second target receiving ports; and sending the received test results to the first communication device through the first target sending port.

14. The non-transitory storage medium according to claim 13, wherein performing testing based on the data switch that has been configured, comprises:

monitoring data transmission of the plurality of communication devices through the data switch that has been configured, determining a monitoring port corresponding to the upper computer from the plurality of initial sending ports;

performing the data transmission between the plurality of communication devices based on the plurality of ports other than the monitoring port and the plurality of initial receiving ports;

transmitting transmission data between the plurality of communication devices connected with each other to the upper computer according to the monitoring port; and monitoring the plurality of communication devices through the upper computer according to the transmission data.

* * * * *